United States Patent
Kim

(10) Patent No.: US 11,097,773 B2
(45) Date of Patent: Aug. 24, 2021

(54) APPARATUS AND METHOD FOR CONTROLLING STEERING OF VEHICLE

(71) Applicant: MANDO CORPORATION, Gyeonggi-do (KR)

(72) Inventor: Seong Joo Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 357 days.

(21) Appl. No.: 16/289,568

(22) Filed: Feb. 28, 2019

(65) Prior Publication Data

US 2019/0270478 A1   Sep. 5, 2019

(30) Foreign Application Priority Data

Mar. 2, 2018   (KR) .................. 10-2018-0025412

(51) Int. Cl.
*B60R 22/00* (2006.01)
*B62D 5/04* (2006.01)
*B62D 15/02* (2006.01)

(52) U.S. Cl.
CPC ......... *B62D 5/0484* (2013.01); *B62D 15/024* (2013.01)

(58) Field of Classification Search
CPC .......................... B62D 5/0484; B62D 15/024
See application file for complete search history.

(56) References Cited

U.S. PATENT DOCUMENTS

| 2016/0016582 | A1 | 1/2016 | Han et al. | |
|---|---|---|---|---|
| 2018/0154936 | A1* | 6/2018 | Yamasaki | B62D 6/08 |
| 2019/0016378 | A1* | 1/2019 | Itou | H02P 5/46 |

FOREIGN PATENT DOCUMENTS

| CN | 101716952 | 6/2010 |
|---|---|---|
| CN | 101767535 | 7/2010 |
| CN | 102026864 | 4/2011 |
| CN | 102285372 | 12/2011 |
| DE | 198 33 460 | 1/2000 |
| GB | 2 361 899 | 11/2001 |
| JP | 2-105201 | 4/1990 |
| JP | 7-215231 | 8/1995 |
| JP | 5261962 | 5/2013 |
| JP | 6229745 | 10/2017 |
| KR | 10-1571629 | 11/2015 |

OTHER PUBLICATIONS

Office Action dated Apr. 16, 2019 for Korean Application No. 10-2018-0025412 and its English machine translation by Google Translate.
Office Action dated Feb. 2, 2021 for Chinese Application No. 201910161289.8 and its English machine translation by Google Translate/Global Dossier.

* cited by examiner

*Primary Examiner* — Adam M Alharbi
(74) *Attorney, Agent, or Firm* — Ladas & Parry, LLP

(57) ABSTRACT

The present disclosure relates to an apparatus and a method for controlling steering of a vehicle and, more particularly, for steering independently each of the vehicle wheels by using respective steering controller based on the target steering angle information for each vehicle wheel, determining the normal steering controller among a plurality of the steering controllers, re-determining the target steering angle information of the vehicle wheel connected to the normal steering controller by using a driving information of the vehicle, and steering the vehicle wheels based on the re-determined target steering angle information.

20 Claims, 12 Drawing Sheets

(a)

(b)

(c)

(d)

APPARATUS AND METHOD FOR CONTROLLING STEERING OF VEHICLE

CROSS REFERENCE TO RELATED APPLICATION

This application claims priority from Korean Patent Application No. 10-2018-0025412, filed on Mar. 2, 2018, which is hereby incorporated by reference for all purposes as if fully set forth herein.

BACKGROUND OF THE INVENTION

1. Field of the Invention

The present disclosure relates to a steering system and, more particularly, to a controlling steering system for vehicle.

2. Description of the Prior Art

A steering system for vehicle may be defined as a system in which the driver of the vehicle can change the steering angle of the wheel based on the steering force or torque applied to the steering wheel. Recently, an electric power steering (EPS) system has been applied to vehicles in order to reduce the steering force of the driver applied to the steering wheel so that to ensure the stability of the steering state.

This electric power steering (EPS) system may drive a steering motor according to the vehicle speed and the torque state applied to the steering wheel of the vehicle to provide a light and comfortable steering feeling to the driver of the vehicle in a low vehicle speed condition, and a heavy steering feeling to the driver of the vehicle in a high vehicle speed condition. In addition, the EPS system may provide a rapid steering control in an emergency condition so that provide the driver of the vehicle with an optimal steering control state.

Recently, an independent steering systems applied to autonomous vehicles have been actively studied. Particularly, a study on a fail-safe function that can cope with the failure of the steering system is actively conducted.

SUMMARY OF THE INVENTION

Accordingly, an aspect of the present disclosure is to provide a steering apparatus for a vehicle that can prevent a deviation of the driving trajectory of a vehicle.

Also, another aspect of the present disclosure is to provide a steering control method for a vehicle that can prevent a departure of a driving trajectory of a vehicle.

In accordance with an aspect of the present disclosure, there is provided an apparatus for controlling steering of a vehicle. The apparatus includes: at least one of a steering controller, each of which being connected to each vehicle wheel and to independently control a steering of each vehicle wheel based on a target steering angle information of each wheel; and a controller for determining a normal steering controller among at least one of the steering controller and, if a failure occurs in at least one of the steering controllers, for re-determining a target steering angle information for the vehicle wheel connected to the normal steering controller based on a driving information of the vehicle, wherein the normal steering controller controlling the steering of the vehicle wheel connected to the normal steering controller based on the re-determined target steering angle information.

In accordance with another aspect of the present disclosure, there is provided an apparatus for controlling steering of a vehicle. The apparatus includes: at least one of a steering controller, each of which being connected to each vehicle wheel and to independently control a steering of each vehicle wheel based on a target steering angle information of each wheel; and a controller for determining a target steering angle information for each vehicle wheel based on a driving information of the vehicle and providing the target steering angle information to the corresponding steering controller; wherein each of at least one of the steering controller determines a normal steering controller among at least one of the steering controller each other and, if a failure occurs in at least one of the steering controllers, the normal steering controller re-determines a target steering angle information for the vehicle wheel connected to the normal steering controller based on a driving information of the vehicle and controls the steering of the vehicle wheel connected to the normal steering controller based on the re-determined target steering angle information.

In accordance with another aspect of the present disclosure, there is provided a method for controlling steering of a vehicle. The method includes: determining a target steering angle information for each vehicle wheel based on a driving information of the vehicle; steering a respective vehicle wheel based on the target steering angle information independently by using at least one of a steering controller, each of which configured to be connected to each vehicle wheel and configured to independently control a steering of each vehicle wheel; determining a normal steering controller among at least one of the steering controller; re-determining a target steering angle information for the vehicle wheel connected to the normal steering controller based on the driving information of the vehicle; and controlling the steering of the vehicle wheel connected to the normal steering controller based on the re-determined target steering angle information.

As described above, according to an embodiment of the present disclosure, it is possible to identify the normal steering controller among a plurality of the steering controller for each vehicle wheel on the occurrence of a failure of the system and to re-calculate the target steering angle information for the vehicle, thereby preventing a deviation of the driving trajectory of the vehicle and enhancing the reliability of the steering system of the vehicle.

In addition, it is possible to reduce the turning radius at low vehicle speed and to secure yaw stability at high vehicle speed.

Also, according to embodiments of the present disclosure, even if a failure occurs in the steering system, the driving trajectory of a vehicle may be maintained thereby enhancing the reliability of the steering system of the vehicle.

Also, according to embodiments of the present disclosure, even if a failure occurs in the steering system, it is possible to maintain a cornering force generated at the vehicle wheel before and after the failure thereby reducing the turning radius at low vehicle speed and securing yaw stability at high vehicle speed.

BRIEF DESCRIPTION OF THE DRAWINGS

The above and other aspects, features and advantages of the present disclosure will be more apparent from the following detailed description taken in conjunction with the accompanying drawings, in which:

FIG. 1 is a schematic block diagram illustrating a configuration of a vehicle steering control system according to an embodiment of the present disclosure.

DETAILED DESCRIPTION OF THE EXEMPLARY EMBODIMENTS

Figure 1:
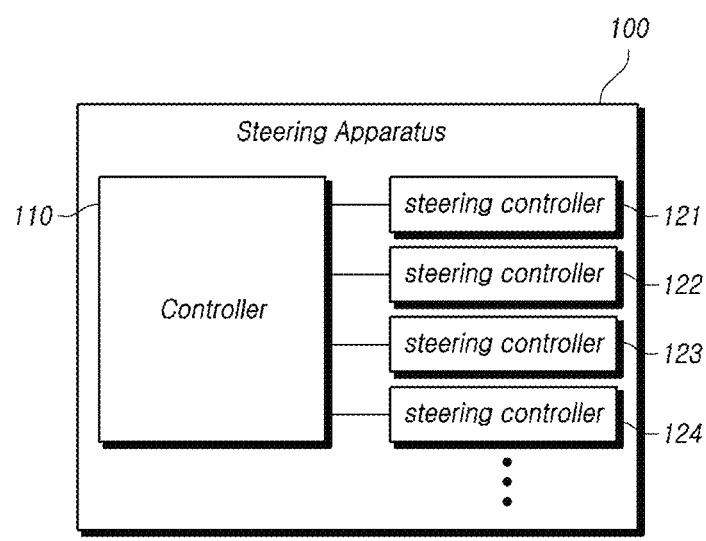

Hereinafter, exemplary embodiments of the present disclosure will be described in detail with reference to the accompanying drawings. The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Hereinafter, a vehicle steering apparatus or a vehicle steering control apparatus according to the present embodiments will be described with reference to the accompanying drawings.

FIG. 1 is a block diagram illustrating a schematic configuration of a vehicle steering control system according to an embodiment of the present disclosure.

Figure 2:
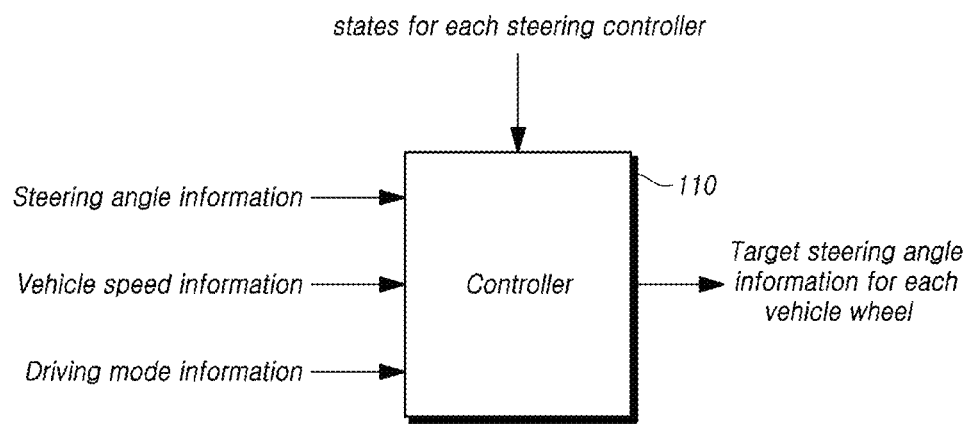
FIG. 2 is a view for explaining the operation of the controller of the vehicle steering control apparatus according to an embodiment of the present disclosure.
Figure 3:
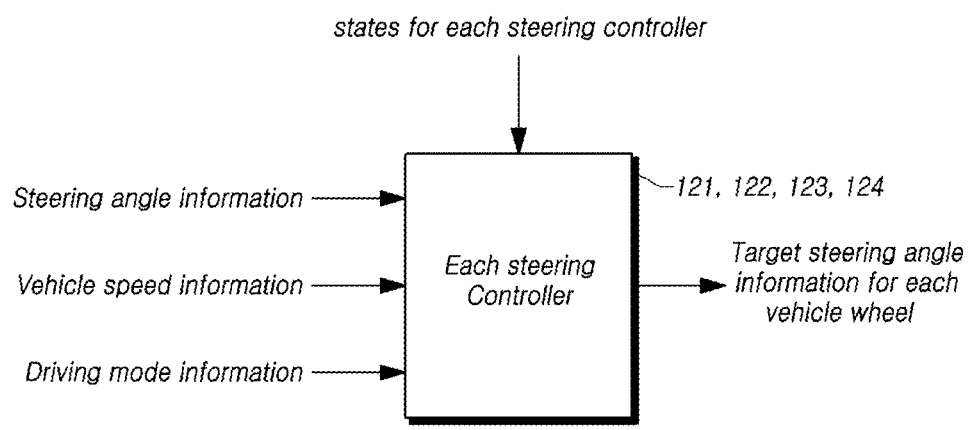
FIG. 3 is a view for explaining the operation of each of the steering controllers in the vehicle steering control apparatus according to an embodiment of the present disclosure.

FIG. 2 is a view for explaining the operation of the controller of the vehicle steering control apparatus according to an embodiment of the present disclosure, and FIG. 3 is a view for explaining the operation of each of the steering controllers in the vehicle steering control apparatus according to an embodiment of the present disclosure.

Referring to FIG. 1, the vehicle steering control apparatus 100 according to an embodiment may include a controller 110 and a plurality of steering controllers 121, 122, 123 and 124.

The controller 110 may be used with the same meaning as the term of "a controller" and each of the plurality of steering controllers may be used with the same meaning as the term of "a steering controller".

The controller 110 may calculate the target steering angle information for each vehicle wheel based on the driving information of the vehicle and provide the target steering angle information to the respective steering controllers 121, 122, 123 and 124.

Specifically, the controller 110 may receive driving information of a vehicle from at least one of sensor module (not shown) which is installed in the vehicle and detects driving states of the vehicle.

The sensor module may include a plurality of sensors for detecting information related to the running state of the vehicle such as a vehicle speed sensor, a torque sensor, and a steering angle sensor.

Also, the controller 110 may calculate the target steering angle information of each wheel based on the driving information of the vehicle provided from the sensor module.

Also, the controller 110 may provide target steering angle information calculated for each vehicle wheel to the corresponding steering controllers 121, 122, 123, and 124, respectively.

The driving information of the vehicle may be information indicating the running state of the vehicle.

For example, the driving information of the vehicle may include at least one of vehicle speed information of the vehicle, torque information of the vehicle, steering angle information of the steering wheel, predetermined reference steering angle information, and steering angle information calculated in real time.

However, the driving information of the vehicle is not limited to these information, and may further include other information indicating the running state of the vehicle.

The controller 110 can calculate or determine the target steering angle information of each vehicle wheel by using the driving information of the vehicle based on the determined driving mode of the vehicle.

Also, the controller 110 may provide the target steering angle information determined for each of the vehicle wheels to the steering controllers 121, 122, 123, and 124, respectively.

In one example, if the driving mode of the vehicle is the manual driving mode, the controller 110 may calculate the target steering angle for each vehicle wheel by using the steering angle information of the steering wheel and the vehicle speed information of the vehicle. Also, the controller 110 may provide the calculated target steering angle information for each of the vehicle wheels to the steering controllers 121, 122, 123, and 124, respectively.

In another example, if the driving mode of the vehicle is the autonomous driving mode, the controller 110 may calculate the target steering angle information of each vehicle wheel by using the steering angle information determined in real time among the driving information of the vehicle and the vehicle speed information of the vehicle. Also, the controller 110 may provide the calculated target steering angle information for each of the vehicle wheels to the steering controllers 121, 122, 123, and 124, respectively.

Each of the steering controllers 121, 122, 123, and 124 may be connected to each of the vehicle wheels and each of the steering controllers 121, 122, 123 and 124 may be connected to the controller 110.

Each of the steering controllers 121, 122, 123 and 124 may independently control the steering of each vehicle wheel based on the target steering angle information for each vehicle wheel provided from the controller 110.

The steering controllers 121, 122, 123 and 124 may include a left front wheel steering controller, a right front wheel steering controller, a left rear steering controller and a right rear wheel steering controller.

The left front steering controller may be connected to the left front vehicle wheel among four vehicle wheels. The right front steering controller may be connected to the right front vehicle wheel, the left rear steering controller may be connected to the left rear vehicle wheel, and the right rear steering controller may be connected to the right rear vehicle wheel.

The steering apparatus 100 of the vehicle according to the present embodiments including the controller 110 and the respective steering controllers 121, 122, 123 and 124 may include four corners steering device of the vehicle capable of independently steering the four vehicle wheels.

Each of the steering controllers 121, 122, 123 and 124 may be mechanically separated from each other and may be connected to each other through a wire communication or a wireless communication. Also, each of the steering controllers 121, 122, 123, and 124 may be connected to the controller 110 by using a wire communication or a wireless communication.

The steering apparatus 100 of the vehicle according to the present embodiments including the controller 110 and the respective steering controllers 121, 122, 123 and 124 may include a steer-by-wire (SBW) based vehicle steering apparatus.

In the present disclosure, the case in which there are four vehicle wheels is described as one embodiment, but the present invention is not limited thereto. The number of vehicle wheels is not limited to a specific number provided that the invention according to this disclosure can be practically applied without any contradiction.

Referring to FIGS. 1 and 2, if at least one of the steering controllers 121, 122, 123, and 124 has a failure, the controller 110 according to the present embodiment may re-calculate or re-determine the target steering angle information of each of the vehicle wheels.

The controller 110 may determine or identify the normal steering controller among the steering controllers 121, 122, 123, and 124. For example, the controller 110 determines whether each of the steering controllers 121, 122, 123, and 124 has a failure or not, and determines the normal steering controller which normally operate among the plurality of the steering modules 121, 122, 123 and 124.

Specifically, the controller 110 monitors the statuses of the respective steering controllers 121, 122, 123, and 124 at a predetermined time points and determines whether a failure for each of steering controllers 121, 122, 123 and 124 has occurred.

According to an example, the predetermined time points may be set as continuous time points in real time, or may be set as time points according to a predetermined period.

However, the predetermined time points are not limited to a specific time points as above and may be set at an arbitrary points in time as required.

The controller 110 may determine the steering controller which normally operate as a normal steering controller and the steering controller with a failure as a failure steering controller.

According to the other embodiment, the controller 110 monitors the communication transmission and reception statuses of the respective steering controllers 121, 122, 123 and 124 at predetermined time points, determines whether each of the steering controllers 121, 122, 123, and 124 has a failure or not, and determines the normal steering controller which normally operate among the plurality of the steering modules 121, 122, 123 and 124.

As a result of the determination, the controller 110 may determine the steering controller having a good communication transmission and reception status as a normal steering controller and the steering controller having a poor communication transmission and reception status as a failure steering controller.

In another example, the controller 110 monitors the driving control status for each vehicle wheel by the steering controllers 121, 122, 123 and 124 at a preset time point and determines whether each of the steering controllers 121, 122, 123, and 124 has a failure. As a result of the determination, the controller 110 may determine the steering controller connected to the vehicle wheel that maintains the driving trajectory as the normal steering controller and the steering controller connected to the vehicle wheel that deviates from the driving trajectory as the failure steering controller.

The controller 110 may re-calculate or re-determine the target steering angle information of the vehicle wheel connected to the normal steering controller by using the driving information of the vehicle. The controller 110 may provide the re-calculated target steering angle information to the corresponding normal steering controller.

In one example, the controller 110 re-calculates the target steering angle information of the vehicle wheel connected to the normal steering controller so that the driving trajectory values of the vehicle wheel for each of the steering controllers 121, 122, 123, and 124 are substantially identical before and after the failure.

More specifically, the controller 110 re-calculates the target steering angle information of the vehicle wheel connected to the normal steering controller. The re-calculated target steering angle information may be value capable of having identical driving trajectory value before and after the failure of at least one of the steering controllers 121, 122, 123, and 124. The re-calculated target steering angle information may be value capable that a sum of the cornering force required to following the identical driving trajectory value of the vehicle is identically maintained before and after the failure of at least one of the steering controllers.

Specifically, the controller 110 may determine the driving trajectory of the vehicle for each of the steering controllers 121, 122, 123 and 124 by using the driving information of the vehicle prior to occur a failure at one of the steering controllers. In addition, the controller 110 may determine the driving trajectory of the vehicle for the normal steering controller by using the driving information of the vehicle after occurrence of the failure of at least one of the steering controllers 121, 122, 123 and 124.

The controller 110 may re-calculates or re-determines the target steering angle information of the vehicle wheel connected to the normal steering controller so that the driving trajectory of the vehicle are maintained as the substantially identical value before and after the failure of at least one of the steering controllers 121, 122, 123 and 124. The controller 110 may provide the re-calculated target steering angle information to the normal steering controller respectively.

In another embodiment, the controller 110 may re-calculates or re-determines the target steering angle information of the vehicle wheel connected to the normal steering controller in order that a sum of the cornering force values generated at the vehicle wheels is maintained as substantially identical value before and after the failure of at least one of the steering controllers.

Specifically, the controller 110 may determine the cornering force value generated at each of the vehicle wheel connected to each of the steering controllers 121, 122, 123 and 124 by using the driving information of the vehicle prior to occur a failure at one of the steering controllers. In addition, the controller 110 may determine the cornering force value generated at the vehicle wheel connected to the normal steering controller by using the driving information of the vehicle after occurrence of the failure of at least one of the steering controllers 121, 122, 123 and 124.

The controller 110 may re-calculates or re-determines the target steering angle information of the vehicle wheel connected to the normal steering controller so that a sum of the cornering force values generated at the vehicle wheels is maintained as substantially identical value before and after the failure of at least one of the steering controllers. The controller 110 may provide the re-calculated target steering angle information to the normal steering controller respectively.

The normal steering controller among the steering controllers 121, 122, 123, 124 may control steering of the vehicle wheels based on the re-calculated target steering angle information. For example, the normal steering controller among the steering controllers 121, 122, 123, and 124 may perform angle tracking control according to the re-calculated target steering angle information to steer the vehicle wheels.

According to one example, it is assumed that the normal steering controller includes three steering controllers. That is, three steering controllers among the four steering controllers of the left front steering controller, the right front steering controller, the left rear steering controller, and the right rear steering controller are the normal steering controllers, and a failure may occur in any one of the four steering controllers.

In this case, the controller 110 may re-calculate or re-determine the target steering angle information of the vehicle wheels connected to the three normal steering controllers by using the driving information of the vehicle.

That is, as described above, the controller 110 may re-calculate or re-determine the target steering angle information of the vehicle wheels connected to the three normal steering controllers based on the driving trajectory values of the respective vehicle wheels or based on the cornering force values generated by the vehicle wheels. The controller 110 may provide the re-calculated target steering angle information to the three normal steering controllers, respectively.

In one example, the controller 110 may determine the cornering force value generated by each of the four vehicle wheels connected to respective steering controller 121, 122, 123 and 124. After a failure occurs in one of the steering controllers, the controller 110 may determine the cornering force value generated by each of the three vehicle wheels connected to respective normal steering controllers.

The controller 110 may re-calculate or re-determine the target steering angle information for each of three vehicle wheels connected to the respective three normal steering controllers in order that a sum of the cornering force values generated by each of the four vehicle wheels prior to the failure of the steering controller is maintained as substantially same value as a sum of the cornering force values generated by each of the three vehicle wheels connected to the normal steering controllers after the failure of one steering controller.

Each of three normal steering controllers may control steering of the corresponding vehicle wheels based on the re-calculated target steering angle information for the vehicle wheel respectively. That is, Each of three normal steering controllers may control steering of the corresponding vehicle wheels by performing the angle tracking control according to the re-calculated target steering angle information respectively.

According to another example, it is assumed that the normal module is two steering controllers. That is, the normal steering controller may include a steering controller of one of a left front steering controller and a right front steering controller, and a steering controller of one of a left rear steering controller and a right rear wheel steering controller.

In this case, the controller 110 may re-calculate or re-determine the target steering angle information of the vehicle wheels connected to the two normal steering controllers by using the driving information of the vehicle. That is, as described above, the controller 110 re-calculates or re-determine the target steering angle information of the vehicle wheels connected to the two normal steering controllers by using the driving trajectory values of the respective vehicle wheels or by using the cornering force values generated by the vehicle wheels. The controller 110 may provide the re-calculated target steering angle information to the two normal steering controllers, respectively.

For example, the controller 110 may determine the cornering force value generated by each of the four vehicle wheels connected to respective steering controller 121, 122, 123 and 124. After a failure occurs in two of the steering controllers, the controller 110 may determine the cornering force value generated by each of the two vehicle wheels connected to respective two normal steering controllers.

The controller 110 may re-calculate or re-determine the target steering angle information for each of two vehicle wheels connected to the respective two normal steering controllers in order that a sum of the cornering force values generated by each of the four vehicle wheels prior to the failure of the steering controllers is maintained as substantially same value as a sum of the cornering force values generated by each of the two vehicle wheels connected to the normal steering controllers after the failure of two steering controller.

Each of two normal steering controllers may control steering of the corresponding vehicle wheels based on the re-calculated target steering angle information for the vehicle wheel respectively. That is, Each of two normal steering controllers may control steering of the corresponding vehicle wheels by performing the angle tracking control according to the re-calculated target steering angle information respectively.

According to the embodiments, if a failure occurs in the steering controller for vehicle wheel, the target steering angle information of the vehicle wheel connected to the normal steering controller is re-calculated by using the driving information of the vehicle, and the vehicle wheels connected to the normal steering controller is steered based on the re-calculated target steering angle information. As a result, it is possible not only to prevent a deviation of the driving trajectory of the vehicle but also to increase the reliability of the steering apparatus of the vehicle, and to reduce the turning radius at low vehicle speed and to secure the yaw stability of the vehicle at high vehicle speed.

Furthermore, if a failure occurs in the steering controller for vehicle wheel, the target steering angle information of the vehicle wheel connected to the normal steering controller is re-calculated in order that the driving trajectory of the vehicle is substantially identically maintained before and after occurrence of failure in the steering controller, and the vehicle wheels connected to the normal steering controller is steered by performing the angle tracking control based on the re-calculated target steering angle information. Thereby, it is possible not only to prevent a deviation of the driving trajectory of the vehicle but also to increase the reliability of the steering apparatus of the vehicle, and to reduce the turning radius at low vehicle speed and to secure the yaw stability of the vehicle at high vehicle speed.

Furthermore, if a failure occurs in the steering controller for vehicle wheel, the target steering angle information of the vehicle wheel connected to the normal steering controller is re-calculated in order that the sum of the cornering force generated by the vehicle wheels is substantially identically maintained before and after occurrence of failure in the steering controller, and the vehicle wheels connected to the normal steering controller is steered by performing the angle tracking control based on the re-calculated target steering angle information. Thereby, it is possible not only to prevent a deviation of the driving trajectory of the vehicle but also to increase the reliability of the steering apparatus of the vehicle, and to reduce the turning radius at low vehicle speed and to secure the yaw stability of the vehicle at high vehicle speed.

Referring to FIG. 1 and FIG. 3, if a failure occurs in at least one of the steering controllers 121, 122, 123, and 124, each of the steering controllers 121, 122, 123 and 124 may re-calculate or re-determine the target steering angle information for each of the vehicle wheels according to the another embodiment.

Each of the steering controllers 121, 122, 123, and 124 may be provided with a driving mode information of the vehicle determined by the controller 110. If the driving mode of the vehicle is the manual driving mode, Each of the steering controllers 121, 122, 123, and 124 may be provided with the target steering angle information for each of the vehicle wheels calculated by the controller 110 based on the steering angle information of the steering wheel and the vehicle speed information of the vehicle.

If the driving mode of the vehicle is the autonomous driving mode, the controller 110 may calculate the target steering angle information of each vehicle wheel by using the steering angle information determined in real time among the driving information of the vehicle and the vehicle speed information of the vehicle. Each of the steering controllers 121, 122, 123, and 124 may be provided with the target steering angle information for each of the vehicle wheels from the controller 110.

Each of the steering controllers 121, 122, 123, and 124 may perform the angle tracking control based on the target steering angle information of each of vehicle wheels so as to steer each of the vehicle wheels.

Each of the steering controllers 121, 122, 123, and 124 may determine a normal steering controller among at least one of the steering controllers each other. For example, each of the steering controllers 121, 122, 123, and 124 may determine a normal steering controller by checking each other whether the respective steering controllers 121, 122, 123, and 124 has a failure or not.

Specifically, each of the steering controllers 121, 122, 123, and 124 may monitor the statuses of the respective steering controllers 121, 122, 123, and 124 each other at a predetermined time points and determines whether a failure for each of steering controllers 121, 122, 123 and 124 has occurred.

According to an example, the predetermined time points may be set as continuous time points in real time, or may be set as time points according to a predetermined period. However, the predetermined time points are not limited to a specific time points as above and may be set at an arbitrary points in time as required.

Each of the steering controllers 121, 122, 123, and 124 may determine the steering controller which nornally operate as a normal steering controller and the steering controller with a failure as a failure steering controller.

According to an embodiment, each of the steering controllers 121, 122, 123, and 124 may monitor the communication transmission and reception statuses of the respective steering controllers 121, 122, 123 and 124 each other at predetermined time points, and may determine whether each of the steering controllers 121, 122, 123, and 124 has a failure or not. Each of the steering controllers 121, 122, 123, and 124 may determine the steering controller having a good communication transmission and reception status as a normal steering controller and the steering controller having a poor communication transmission and reception status as a failure steering controller.

In another example, each of the steering controllers 121, 122, 123, and 124 may monitor the driving control status for each vehicle wheel connected to respective steering controllers 121, 122, 123 and 124 at a preset time point and may determine whether each of the steering controllers 121, 122, 123, and 124 has a failure. As a result of the determination, each of the steering controllers 121, 122, 123, and 124 may determine the steering controller connected to the vehicle wheel that maintains the driving trajectory as the normal steering controller and the steering controller connected to the vehicle wheel that deviates from the driving trajectory as the failure steering controller.

The normal steering controller may re-calculate or re-determine the target steering angle information of the vehicle wheel connected to the normal steering controller by using the driving information of the vehicle. The normal steering controller may control the steering of the vehicle wheel connected to the normal steering controller based on the re-calculated target steering angle information of the vehicle wheel.

In one example, the normal steering controller may re-calculate the target steering angle information of the vehicle wheel connected to the normal steering controller so that the driving trajectory values of the vehicle wheel for each of the steering controllers 121, 122, 123, and 124 are substantially identical before and after the failure.

In this case, the re-calculated target steering angle information re-determined by the normal steering controller may be value capable of having identical driving trajectory value before and after the failure of at least one of the steering controllers 121, 122, 123, and 124. The re-calculated target steering angle information may be value capable that a sum of the cornering force required to following the identical driving trajectory value of the vehicle is maintained as a substantial same value before and after the failure of at least one of the steering controllers.

Specifically, the normal steering controller may determine the driving trajectory of the vehicle for each of the steering controllers 121, 122, 123 and 124 by using the driving information of the vehicle prior to occur a failure at one of the steering controllers. In addition, the normal steering controller may determine the driving trajectory of the vehicle for the normal steering controller by using the driving information of the vehicle after occurrence of the failure of at least one of the steering controllers 121, 122, 123 and 124.

The normal steering controller may re-calculate or re-determine the target steering angle information of the vehicle wheel connected to the normal steering controller so that a value of the driving trajectory of the vehicle are maintained as the substantially identical value before and after the failure of at least one of the steering controllers 121, 122, 123 and 124. The normal steering controller may perform the angle tracking control based on the target steering angle information of the vehicle wheels so as to steer each of the vehicle wheel connected to the normal steering controller.

In another embodiment, the normal steering controller may re-calculate or re-determine the target steering angle information of the vehicle wheel connected to the normal steering controller in order that a sum of the cornering force values generated at the vehicle wheels is maintained as substantially identical value before and after the failure of at least one of the steering controllers.

Specifically, the normal steering controller may determine the cornering force value generated at each of the vehicle wheel connected to each of the steering controllers 121, 122, 123 and 124 by using the driving information of the vehicle prior to occur a failure at one of the steering controllers. In addition, the normal steering controller may determine the cornering force value generated at the vehicle wheel connected to the normal steering controller by using the driving information of the vehicle after occurrence of the failure of at least one of the steering controllers 121, 122, 123 and 124.

The normal steering controller may re-calculate or re-determine the target steering angle information of the vehicle wheel connected to the normal steering controller so that a sum of the cornering force values generated at the vehicle wheels is maintained as substantially identical value before and after the failure of at least one of the steering controllers. The normal steering controller may perform angle tracking control according to the re-calculated target steering angle information to steer the vehicle wheel connected to the normal steering wheel.

According to one example, it is assumed that the normal steering controller includes three steering controllers. That is, three steering controllers among the four steering controllers of the left front steering controller, the right front steering controller, the left rear steering controller, and the right rear steering controller are the normal steering controllers, and a failure may occur in any one of the four steering controllers.

In this case, each of the three normal steering controllers may re-calculate or re-determine the target steering angle information of each of the vehicle wheels connected to the respective normal steering controllers by using the driving information of the vehicle.

That is, as described above, each of the three normal steering controllers may re-calculate or re-determine the target steering angle information of the vehicle wheels connected to the three normal steering controllers based on the driving trajectory values of the respective vehicle wheels or based on the cornering force values generated by the vehicle wheels. Each of the three normal steering controllers may independently control the steering of the respective vehicle wheels connected to the three normal steering wheels based on the re-calculated target steering angle information of the vehicle wheels.

In one example, each of the steering controllers 121, 122, 123, and 124 may determine the cornering force value generated by each of the four vehicle wheels connected to respective steering controller 121, 122, 123 and 124 prior to an occurrence of the failure at one of the steering controllers. After a failure occurs in one of the steering controllers, three normal steering controllers may determine the cornering force value generated by the three vehicle wheels connected to respective normal steering controllers.

Each of three normal steering controllers may re-calculate or re-determine the target steering angle information for each of three vehicle wheels connected to the respective three normal steering controllers in order that a sum of the cornering force values generated by each of the four vehicle wheels prior to the failure of the steering controller is maintained as substantially same value as a sum of the cornering force values generated by each of the three vehicle wheels connected to the normal steering controllers after the failure of one steering controller.

Each of three normal steering controllers may control steering of the corresponding vehicle wheels by performing the angle tracking control according to the re-calculated target steering angle information respectively.

According to another example, it is assumed that the normal module is two steering controllers. That is, the normal steering controller may include a steering controller of one of a left front steering controller and a right front steering controller, and a steering controller of one of a left rear steering controller and a right rear steering controller.

In this case, two normal steering controllers may re-calculate or re-determine the target steering angle information of the vehicle wheels connected to the two normal steering controllers by using the driving information of the vehicle. That is, as described above, two normal steering controllers may re-calculate or re-determine the target steering angle information of the vehicle wheels connected to the two normal steering controllers by using the driving trajectory values of the respective vehicle wheels or by using the cornering force values generated by the vehicle wheels.

Each of the two normal steering controllers may independently control the steering of the respective vehicle wheels connected to the two normal steering wheels based on the re-calculated target steering angle information of the vehicle wheels.

In one example, each of the steering controllers 121, 122, 123, and 124 may determine the cornering force value generated by each of the four vehicle wheels connected to respective steering controller 121, 122, 123 and 124 prior to an occurrence of the failure at two of the steering controllers. After a failure occurs in two of the steering controllers, two normal steering controllers may determine the cornering force value generated by the two vehicle wheels connected to respective normal steering controllers.

Each of two normal steering controllers may re-calculate or re-determine the target steering angle information for each of two vehicle wheels connected to the respective two normal steering controllers in order that a sum of the cornering force values generated by each of the four vehicle wheels prior to the failure of the steering controller is maintained as substantially same value as a sum of the cornering force values generated by each of the two vehicle wheels connected to the normal steering controllers after the failure of two steering controllers.

Each of two normal steering controllers may control steering of the corresponding vehicle wheels by performing the angle tracking control according to the re-calculated target steering angle information respectively.

According to the embodiments, if a failure occurs in the steering controller for vehicle wheel, the target steering angle information of the vehicle wheel connected to the normal steering controller is re-calculated by using the driving information of the vehicle, and the vehicle wheels connected to the normal steering controller is steered based on the re-calculated target steering angle information. As a result, it is possible not only to prevent a deviation of the driving trajectory of the vehicle but also to increase the reliability of the steering apparatus of the vehicle, and to reduce the turning radius at low vehicle speed and to secure the yaw stability of the vehicle at high vehicle speed.

Furthermore, if a failure occurs in the steering controller for vehicle wheel, the steering controllers may monitor each other and determine whether a failure of the each of the steering controller has occurred. As a result of the determination, the target steering angle information of the vehicle wheel connected to the normal steering controller is re-calculated in order that the driving trajectory of the vehicle is substantially identically maintained before and after occurrence of failure in the steering controller, and the vehicle wheels connected to the normal steering controller is steered by performing the angle tracking control based on the re-calculated target steering angle information. Thereby, it is possible not only to prevent a deviation of the driving trajectory of the vehicle but also to increase the reliability of the steering apparatus of the vehicle, and to reduce the turning radius at low vehicle speed and to secure the yaw stability of the vehicle at high vehicle speed.

Furthermore, if a failure occurs in the steering controller for vehicle wheel, the steering controllers may monitor each other and determine whether a failure of the each of the steering controller has occurred. As a result of the determination, the target steering angle information of the vehicle wheel connected to the normal steering controller is re-calculated in order that the sum of the cornering force generated by the vehicle wheels is substantially identically maintained before and after occurrence of failure in the steering controller, and the vehicle wheels connected to the normal steering controller is steered by performing the angle tracking control based on the re-calculated target steering angle information. Thereby, it is possible not only to prevent a deviation of the driving trajectory of the vehicle but also to increase the reliability of the steering apparatus of the vehicle, and to reduce the turning radius at low vehicle speed and to secure the yaw stability of the vehicle at high vehicle speed.

Figure 4:
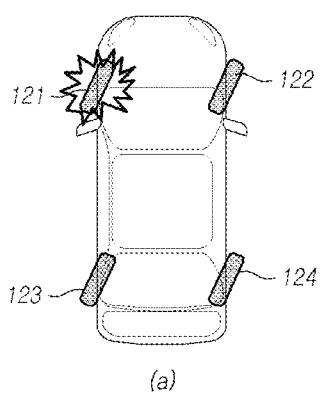
FIG. 4 is a view for explaining a state in which one among the four steering controllers has failed in the vehicle steering control apparatus according to an embodiment of the present disclosure.
Figure 4:
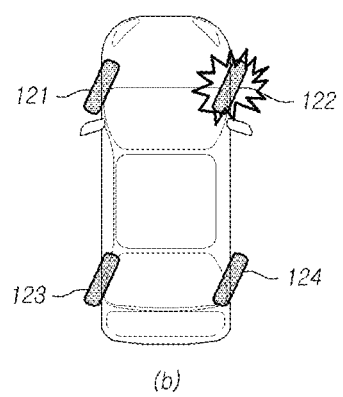
Figure 4:
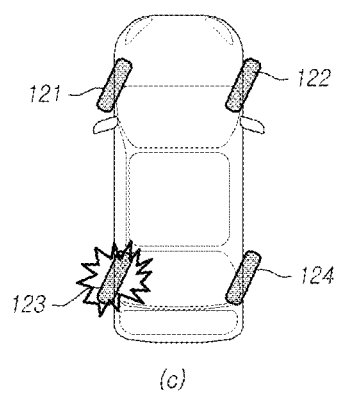
Figure 4:
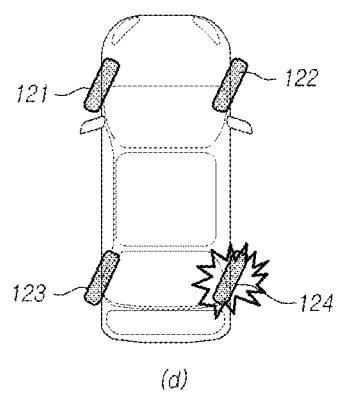

FIG. 4 is a view for explaining a state in which one among the four steering controllers has failed in the vehicle steering control apparatus according to an embodiment of the present disclosure.

Referring to FIG. 4, the four steering controllers 121, 122, 123 and 124 in accordance with the present embodiment may include a left front steering controller 121, a right front steering controller 122, a left rear steering controller 123 and a right rear steering controller 124

Here, the left front steering controller 121 may be connected to the left front wheel of four vehicle wheels. The right front steering controller 122 may be connected to the right front wheel of four vehicle wheels. The left rear steering controller 123 may be connected to the left rear wheel of four vehicle wheels. The right rear steering controller 124 may be connected to the right rear wheel of four vehicle wheels.

Referring to FIG. 4A, if the left front steering controller 121 of the four steering controllers 121, 122, 123, and 124 has a failure, the steering apparatus 100 of the vehicle according to the present embodiment may re-calculate the target steering angle information for the right front vehicle wheel, the left rear vehicle wheel and the right rear vehicle wheel which are connected to the right front steering controller 122, the left rear steering controller 123 and the right rear steering controller 124 respectively, and may steer the right front vehicle wheel, the left rear vehicle wheel and the right rear vehicle respectively based on the re-calculated the target steering angle information.

Referring to FIG. 4B, if the right front steering controller 122 of the four steering controllers 121, 122, 123, and 124 has a failure, the steering apparatus 100 of the vehicle according to the present embodiment may re-calculate the target steering angle information for the left front vehicle wheel, the left rear vehicle wheel and the right rear vehicle wheel which are connected to the left front steering controller 121, the left rear steering controller 123 and the right rear steering controller 124 respectively, and may steer the left front vehicle wheel, the left rear vehicle wheel and the right rear vehicle respectively based on the re-calculated the target steering angle information.

Referring to FIG. 4C, if the left rear steering controller 123 of the four steering controllers 121, 122, 123, and 124 has a failure, the steering apparatus 100 of the vehicle according to the present embodiment may re-calculate the target steering angle information for the left front vehicle wheel, the right front vehicle wheel and the right rear vehicle wheel which are connected to the left front steering controller 121, the right front steering controller 122 and the right rear steering controller 124 respectively, and may steer the left front vehicle wheel, the right front vehicle wheel and the right rear vehicle respectively based on the re-calculated the target steering angle information.

Referring to FIG. 4D, if the right rear steering controller 124 of the four steering controllers 121, 122, 123, and 124 has a failure, the steering apparatus 100 of the vehicle according to the present embodiment may re-calculate the target steering angle information for the left front vehicle wheel, the right front vehicle wheel and the left rear vehicle wheel which are connected to the left front steering controller 121, the right front steering controller 122 and the left rear steering controller 123 respectively, and may steer the left front vehicle wheel, the right front vehicle wheel and the left rear vehicle respectively based on the re-calculated the target steering angle information.

Figure 5:
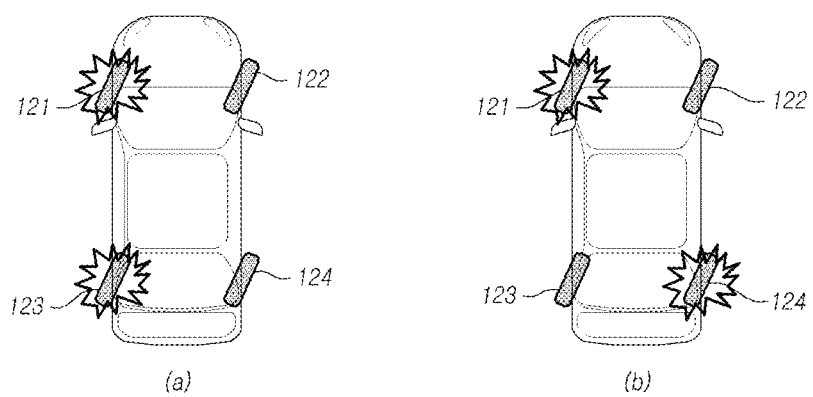
FIG. 5 is a view for explaining a state in which two steering controllers among the four steering controllers have failed in the vehicle steering control apparatus according to an embodiment of the present disclosure.
Figure 5:
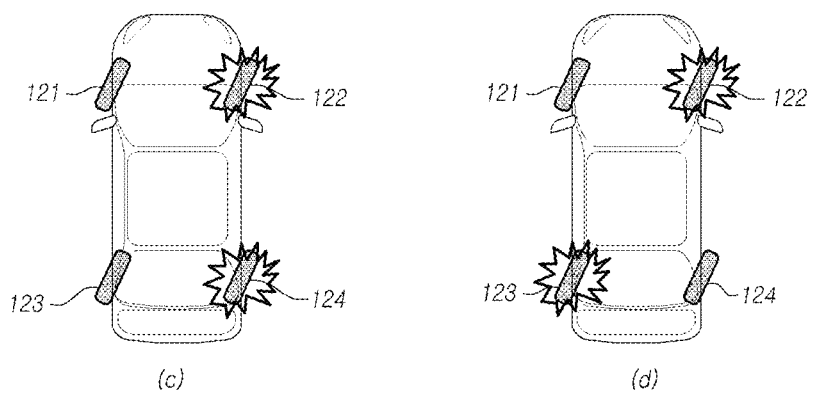

FIG. 5 is a view for explaining a state in which two steering controllers among the four steering controllers have failed in the vehicle steering control apparatus according to an embodiment of the present disclosure.

Referring to the FIG. 5, the four steering controllers 121, 122, 123 and 124 in accordance with the present embodiment may include a left front steering controller 121, a right front steering controller 122, a left rear steering controller 123 and a right rear steering controller 124

Here, the left front steering controller 121 may be connected to the left front vehicle wheel of four vehicle wheels. The right front steering controller 122 may be connected to the right front vehicle wheel of four vehicle wheels. The left rear steering controller 123 may be connected to the left rear vehicle wheel of four vehicle wheels. The right rear steering controller 124 may be connected to the right rear vehicle wheel of four vehicle wheels.

Referring to FIG. 5A, if the left front steering controller 121 and the left rear steering controller 123 of the four steering controllers 121, 122, 123, and 124 have a failure, the steering apparatus 100 of the vehicle according to the present embodiment may re-calculate the target steering angle information for the right front vehicle wheel and the right rear vehicle wheel which are connected to the right front steering controller 122 and the right rear steering controller 124 respectively, and may steer the right front vehicle wheel and the right rear vehicle respectively based on the re-calculated the target steering angle information.

Referring to FIG. 5B, if the left front steering controller 121 and the right rear steering controller 124 of the four steering controllers 121, 122, 123, and 124 have a failure, the steering apparatus 100 of the vehicle according to the present embodiment may re-calculate the target steering angle information for the right front vehicle wheel and the left rear vehicle wheel which are connected to the right front steering controller 122 and the left rear steering controller 123 respectively, and may steer the right front vehicle wheel and the left rear vehicle respectively based on the re-calculated the target steering angle information.

Referring to FIG. 5C, if the right front steering controller 122 and the right rear steering controller 124 of the four steering controllers 121, 122, 123, and 124 have a failure, the steering apparatus 100 of the vehicle according to the present embodiment may re-calculate the target steering angle information for the left front vehicle wheel and the left rear vehicle wheel which are connected to the left front steering controller 121 and the left rear steering controller 123 respectively, and may steer the left front vehicle wheel and the left rear vehicle respectively based on the re-calculated the target steering angle information.

Referring to FIG. 5D, if the right front steering controller 122 and the left rear steering controller 123 of the four steering controllers 121, 122, 123, and 124 have a failure, the steering apparatus 100 of the vehicle according to the present embodiment may re-calculate the target steering angle information for the left front vehicle wheel and the right rear vehicle wheel which are connected to the left front steering controller 121 and the right rear steering controller 124 respectively, and may steer the left front vehicle wheel and the right rear vehicle respectively based on the re-calculated the target steering angle information.

Figure 6:
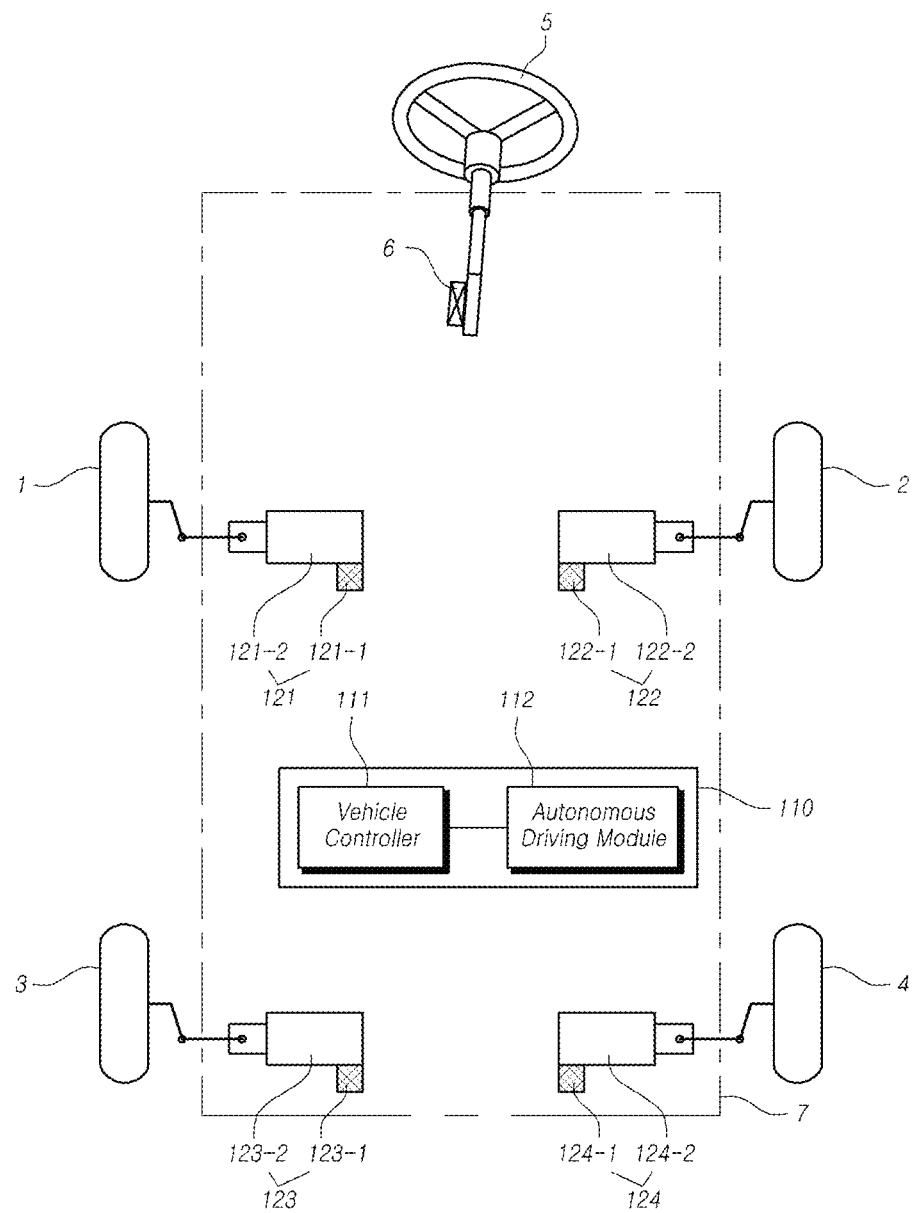
FIG. 6 is a diagram for explaining a steer-by-wire based vehicle steering apparatus according to the present embodiments.

FIG. 6 is a diagram for explaining a steer-by-wire based vehicle steering apparatus according to the present embodiments.

Referring to FIG. 6, the steer-by-wire based vehicle steering apparatus according to the present embodiments may include a controller 110, a plurality of steering controllers 121, 122, 123 and 124, a plurality of vehicle wheels 1, 2, 3 and 4, a steering wheel 5, and a steering angle sensor 6.

Herein, the controller 110, each of the plurality of steering controllers 121, 122, 123 and 124 connected to the each of the plurality of vehicle wheels 1, 2, 3 and 4, and steering wheel 5 may be mechanically separated from each other. The controller 110, each of the plurality of steering controllers 121, 122, 123 and 124 connected to the each of the plurality of vehicle wheels 1, 2, 3 and 4, and steering wheel 5 may be communicated with each other by using a communication network 7 which is a wired communication network or a wireless communication network.

The controller 110 may include a vehicle controller 111 and an autonomous driving module 112. Here, the vehicle controller 111 may receive the steering angle information from the steering angle sensor 6 connected to the steering wheel 5. The vehicle controller 111 may receive steering angle information or predetermined reference steering angle information calculated in real time from the autonomous driving module 112. The vehicle controller 111 may receive driving information of each vehicle from a sensor module (not shown).

Each of the plurality of steering controllers 121, 122, 123 and 124 may include a respective ECU 121-1, 122-1, 123-1, and 124-1, and a respective actuator (i.e. a motor and a reducer) 121-2, 122-2, 123-2 and 124-2. The respective ECU 121-1, 122-1, 123-1, and 124-1 may be connected with each other by using a redundant communication means and may be connected to the controller 110 and the steering wheel 5.

The plurality of steering controllers 121, 122, 123 and 124 may include four steering controllers, that is, a left front steering controller 121, a right front steering controller 122, a left rear steering controller 123, and a right rear steering controller 124.

The left front steering controller 121 may be connected to the left front vehicle wheel 1 among four vehicle wheels. The right front steering controller 122 may be connected to the right front vehicle wheel 2, the left rear steering controller 123 may be connected to the left rear vehicle wheel 3, and the right rear steering controller 124 may be connected to the right rear vehicle wheel 4 among four vehicle wheels.

As described above with reference to FIGS. 1 to 5, the controller 110 and each of the steering controllers 121, 122, 123, and 124 may calculate the target steering angle information of each vehicle wheel using the driving information of the vehicle, and, in addition, may re-calculate the target steering angle information of each vehicle wheel connected to the normal steering controller according to the failure of each of the steering controllers 121, 122, 123, and 124.

The above description with reference to FIGS. 1 to 5 may be applied to a steer-by-wire based vehicle steering apparatus according to the present embodiments, so that duplicate descriptions are omitted to simplify the specification.

Hereinafter, a steering method of a vehicle according to the present embodiments will be described with reference to the accompanying drawings.

Particularly, the description parts overlapping with the steering apparatus 100 of the vehicle according to the embodiments described above with reference to FIGS. 1 to 6 may be omitted in the following for the sake of explanation.

Figure 7:
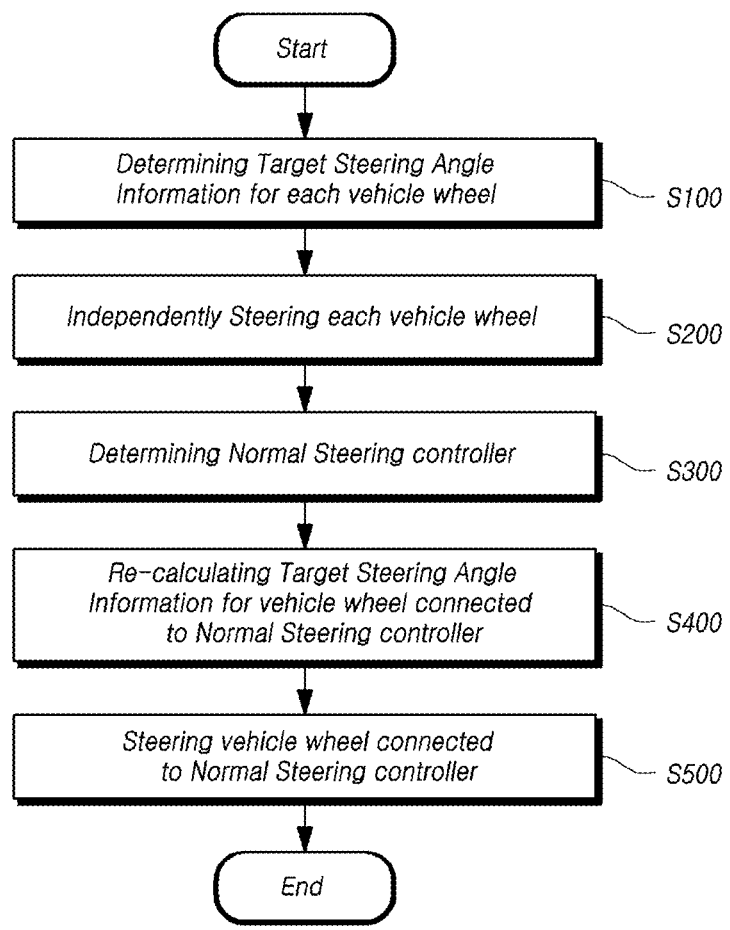
FIG. 7 is a flowchart illustrating a vehicle steering control method according to an embodiment of the present disclosure.

FIG. 7 is a flowchart illustrating a vehicle steering control method according to an embodiment of the present disclosure Referring to FIG. 7, a steering method or steering control method of a vehicle according to the present embodiments may be performed by using a apparatus including a controller 110 and a plurality of steering controllers, that is, a steering device of a vehicle according to the present embodiments as above.

The steering method of a vehicle according to the present embodiment may include a step S100 of calculating target steering angle information of each vehicle wheel, a step S200 of independently steering each vehicle wheel, a step S300 of determining a normal steering controller among the plurality of steering controllers, a step S400 of re-calculating or re-determining the target steering angle information of the vehicle wheel connected to the normal steering controller, and a step S500 of steering the vehicle wheel connected to the normal steering controller.

First, the target steering angle information of each vehicle wheel may be calculated by using the driving information of the vehicle at step S100. Thereafter, in the step S200, each vehicle wheel may be independently steered based on the target steering angle information of each wheel calculated in step S100.

Then, the normal steering controller among the plurality of steering controllers independently steering each vehicle wheel may be determined in step S300. For example, in step S300, it is determined whether each of the steering controllers has failed, and the normal steering controller among the steering controllers may be identified according to the determination result.

The plurality of steering controllers may include a left front steering controller, a right front steering controller, a left rear steering controller, and a right rear steering controller 124.

The left front steering controller may be connected to the left front vehicle wheel among four vehicle wheels. The right front steering controller may be connected to the right front vehicle wheel, the left rear steering controller may be connected to the left rear vehicle wheel, and the right rear steering controller may be connected to the right rear vehicle wheel among four vehicle wheels.

Furthermore, each of the steering controllers may be mechanically separated from each other. Each of the steering controllers may be connected to each other via wired or wireless communication. In addition, each of the steering controllers may be connected to the controller using wired or wireless communication.

Then, the target steering angle information of the vehicle wheel connected to the normal module may be re-calculated or re-determined by using the driving information of the vehicle in step S400.

Thereafter, in step S500, the vehicle wheel connected to the normal steering controller may be steered based on the re-calculated target steering angle information of the vehicle wheel in step S400. For example, in step S500, an angle tracking control may be performed according to the re-calculated target steering angle information of the vehicle wheel in step S400 to steer the vehicle wheels connected to the normal steering controllers.

In one example, in step S500, the angle tracking control may be performed according to the re-calculated target steering angle information of the vehicle wheel to steer each of the three vehicle wheels connected to the three normal steering controllers.

In another example, in step S500, the angle tracking control may be performed according to the re-calculated target steering angle information of the vehicle wheel to steer each of the two vehicle wheels connected to the two normal steering controllers.

Figure 8:
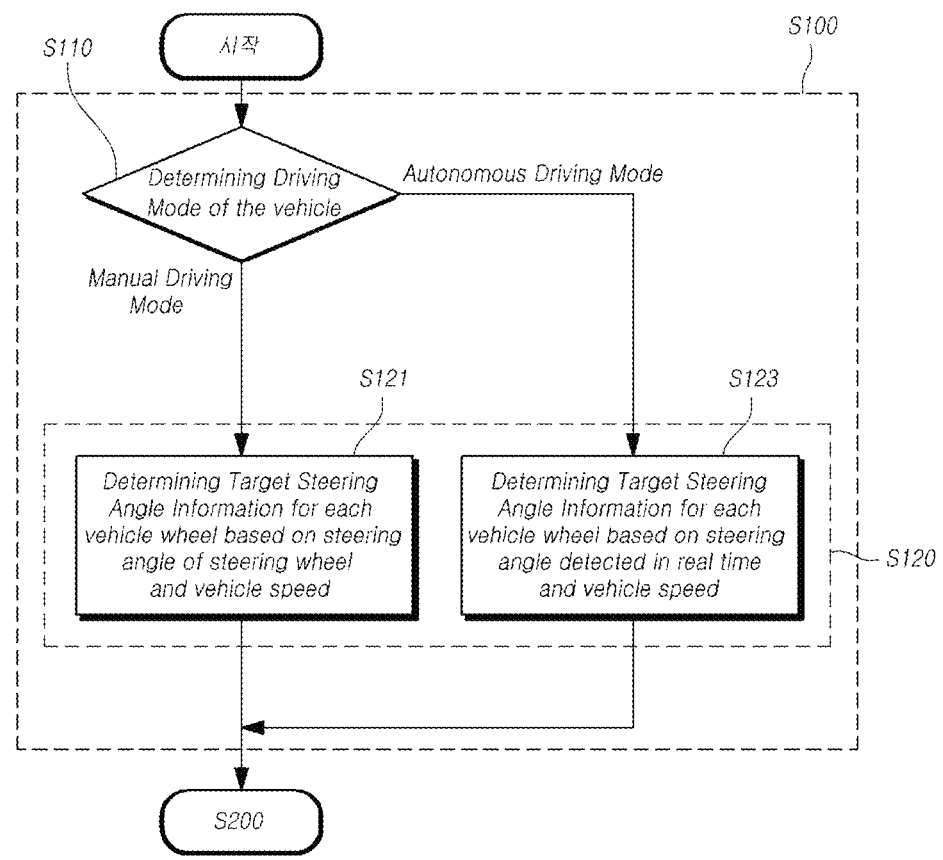
FIG. 8 is a flowchart for determining the target steering angle information for each vehicle wheel according to an embodiment of the present disclosure.

FIG. 8 is a flowchart for determining the target steering angle information for each vehicle wheel according to an embodiment of the present disclosure.

Referring to FIG. 8, the driving mode of the vehicle may be first determined in step S110 in the method of calculating the target steering angle information of each vehicle wheel according to the present embodiments.

Then, in step S120, the target steering angle information of each vehicle wheel may be calculated by using the driving information of the vehicle based on the driving mode of the vehicle determined in step S110.

If the vehicle is in the manual driving mode, the target steering angle information of each vehicle wheel may be calculated based on the steering angle information of the steering wheel and the vehicle speed information of the vehicle in step S121.

If it is determined that the vehicle is in the autonomous driving mode or a self-running mode, the target steering angle information of each vehicle wheels may be calculated based on the steering angle information detected in real time and the vehicle speed information of the vehicle among the driving information of the vehicle in step S123.

Figure 9:
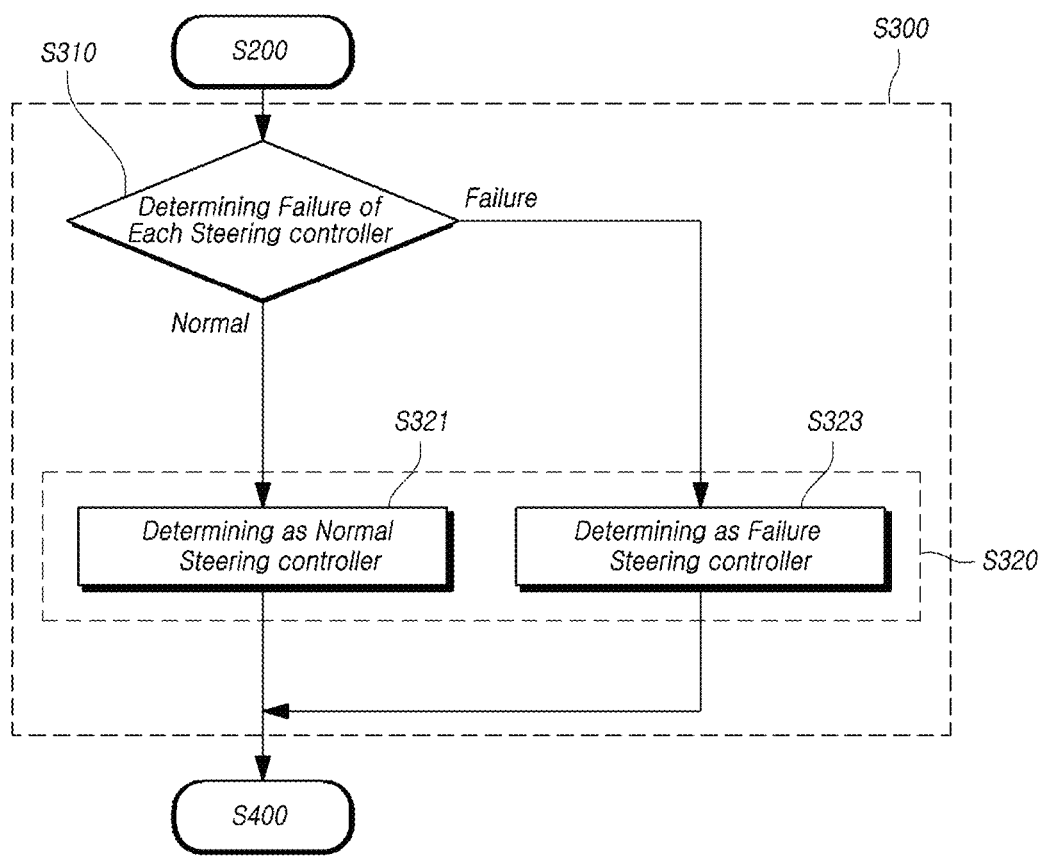
FIG. 9 is a flowchart for determining the normal steering controller from a plurality of the steering controllers according to an embodiment of the present disclosure.

FIG. 9 is a flowchart for determining the normal steering controller from a plurality of the steering controllers according to an embodiment of the present disclosure.

Referring to FIG. 9, in the method for calculating the target steering angle information of each wheel according to the present embodiments, it is possible to determine whether each steering controller has a failure in step S310.

Specifically, at step S310, at least one time point or time among the real-time, periodic, and arbitrary time points, the status of each of the steering controllers may be monitored to determine whether the respective steering controller has a failure.

In one example, in step S310, the communication transmission/reception status of the respective steering controllers may be monitored in at least one time point among the real-time, periodic, and arbitrary time points to determine whether a failure occurs in each of the steering controllers or not.

In another example, in step S310, the wheel drive control state for each steering controller may be monitored in at least one time point among the real-time, periodic, and arbitrary time points to determine whether a failure occurs in each of the steering controllers.

Thereafter, the normal steering controller or the failure steering controller among the plurality of the steering controllers may be identified according to the determination result of step S310 in step S320.

More specifically, in step S320, it is determined that the steering controller with normal state may be determined as a normal steering controller, and the steering controller with abnormal state or poor state may be determined as a failure steering controller.

In step S321, as a result of the determination in step S310, the steering controller with a good communication transmission/reception state may be determined as a normal steering controller. In step S323, as a result of the determination in step S310, the steering controller having the poor communication transmission/reception status may be determined as the failure steering controller.

In another example, in step S321, as a result of the determination in step S310, the steering controller connected to the vehicle wheel that is not deviated from the driving trajectory may be determined as a normal steering controller. In addition, in step S323, the steering controller connected to the vehicle wheel that deviates from the driving trajectory may be determined as a failure steering controller.

Figure 10:
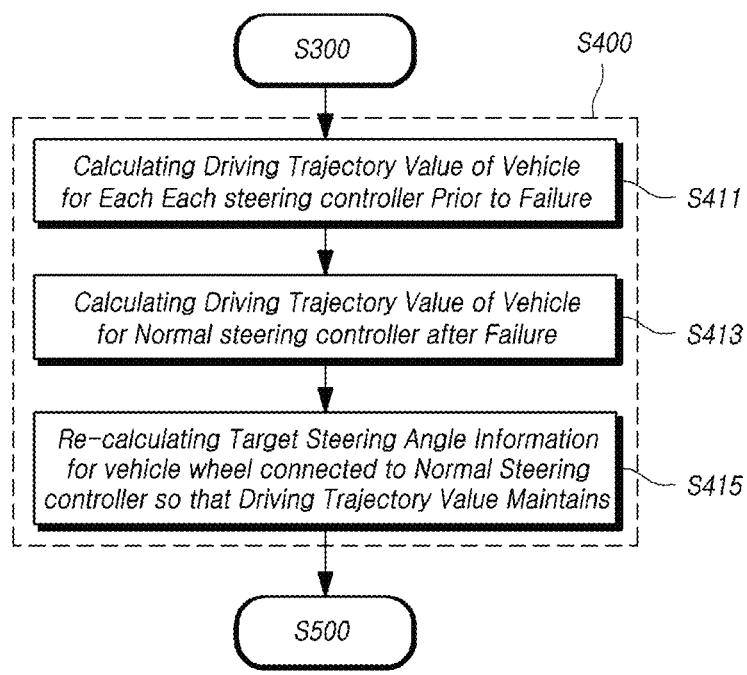
FIG. 10 and FIG. 11 are flowcharts for re-determining the target steering angle information for the vehicle wheel connected to the normal steering controller according to an embodiment of the present disclosure.
Figure 11:
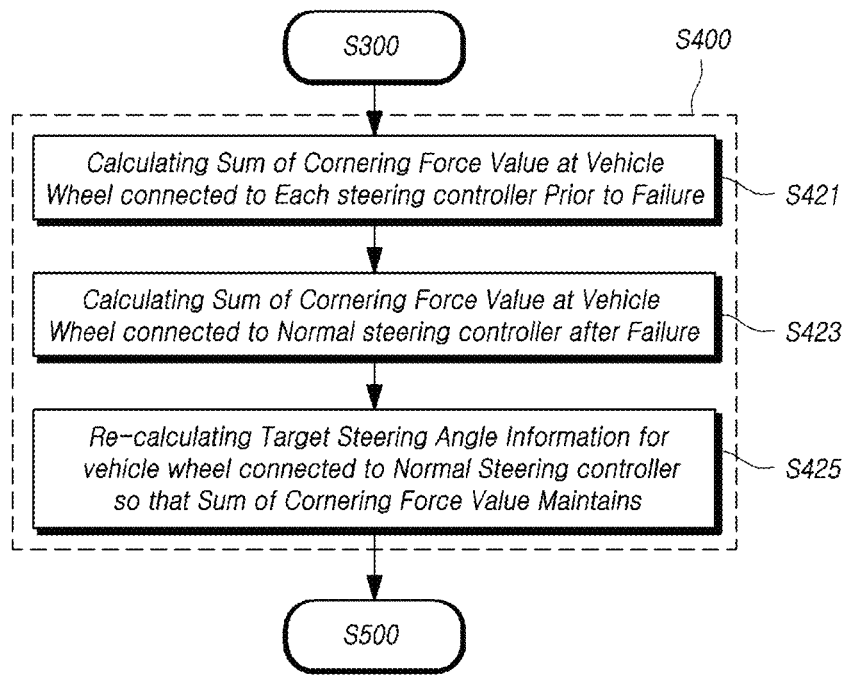

FIG. 10 and FIG. 11 are flowcharts for re-determining the target steering angle information for the vehicle wheel connected to the normal steering controller according to an embodiment of the present disclosure.

Referring to FIG. 10, in the re-calculation method S400 of the target steering angle information of the vehicle wheel connected to the normal module, the target steering angle information of the vehicle wheel connected to the normal module may be re-determined by using the driving information of the vehicle in order that the driving trajectory of the vehicle is substantially identically maintained before and after occurrence of failure in the steering controller.

Specially, the driving trajectory value of the vehicle for each of the steering controllers may be calculated by using the driving information of the vehicle prior to occur a failure at one of the steering controllers in step S411.

Then, the driving trajectory value of the vehicle for the normal steering controller may be determined by using the driving information of the vehicle after occurrence of the failure of at least one of the steering controllers in step S413.

Then, in step S415, the target steering angle information of the vehicle wheel connected to the normal steering controller may be re-calculated so that a value of the driving trajectory of the vehicle are maintained as the substantially identical value before and after the failure of at least one of the steering controllers.

Referring to FIG. 11, in the re-calculation method S400 of the target steering angle information of the vehicle wheel connected to the normal module, the target steering angle information of the vehicle wheel connected to the normal module may be re-determined by using the driving information of the vehicle in order that a sum of the cornering force values generated at the vehicle wheels is maintained as substantially identical value before and after the failure of at least one of the steering controllers.

Specifically, the cornering force value generated at each of the vehicle wheel connected to each of the steering controllers may be calculated by using the driving information of the vehicle prior to occur a failure at one of the steering controllers in step S421.

Then, the cornering force value generated at the vehicle wheel connected to the normal steering controller may be determined by using the driving information of the vehicle after occurrence of the failure of at least one of the steering controllers in step S423.

Then, in step S425, the target steering angle information of the vehicle wheel connected to the normal steering controller may re-calculate or re-determine so that a sum of the cornering force values generated at the vehicle wheels is maintained as substantially identical value before and after the failure of at least one of the steering controllers.

Referring to FIGS. 10 and 11, the normal steering controller may include three steering controllers. For example, the normal steering controller may include three steering controllers selected from a left front steering controller, a right front steering controller, a left rear steering controller, and a right rear steering controller.

In step S400, if there are three normal steering controllers, the target steering angle information of the vehicle wheels connected to the three normal steering controllers may be re-calculated by using the driving information of the vehicle through the above-described manner.

Referring to FIGS. 10 and 11, the normal steering controller may include two steering controllers. For example, the normal steering controller may include two steering controllers selected from a left front steering controller, a right front steering controller, a left rear steering controller, and a right rear steering controller.

In step S400, if there are two normal steering controllers, the target steering angle information of the vehicle wheels connected to the two normal steering controllers may be re-calculated by using the driving information of the vehicle through the above-described manner.

Figure 12:
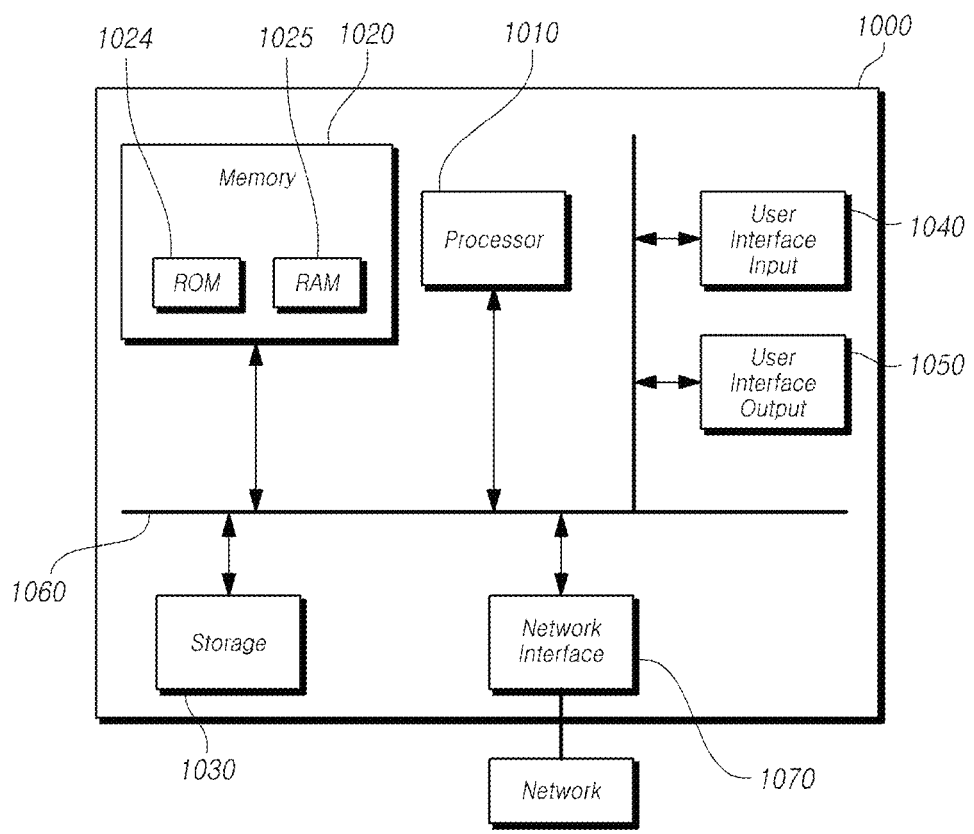
FIG. 12 is a block diagram illustrating a configuration of a vehicle steering control system according to an embodiment of the present disclosure.

FIG. 12 is a block diagram illustrating a configuration of a vehicle steering control system according to an embodiment of the present disclosure.

The embodiments described above may be embodied in a computer system, for example, as a computer-readable recording medium.

As shown in the FIG. 12, a computer system 1000 as a vehicle steering system 100 may include one or more element of a processors 1010, a memory 1020, a storage 1030, a user interface input 1040, and a user interface output 1050, which are capable of communicating with one another via a communication bus 1060. In addition, the computer system 1000 may also include a network interface 1070 for connecting to a network.

The processor 1010 may be a CPU or a semiconductor device that executes processing instructions stored in memory 1020 and/or in the storage 1030.

Memory 1020 and storage 1030 may include various types of volatile/non-volatile storage media. For example, the memory may include ROM 1021 and RAM 1023.

Accordingly, embodiments of the present disclosure may be embodied in a computer-implemented method or non-volatile computer storage medium storing computer-executable instructions. The computer-executable instructions may be executed by the processor to perform the method according to at least one embodiment of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An apparatus for controlling steering of a vehicle, the apparatus comprising:
   at least one of a steering controller, each of which being connected to each vehicle wheel of the vehicle and to independently control a steering of each vehicle wheel based on a target steering angle information of each vehicle wheel; and,
   a controller for determining a normal steering controller among at least one of the steering controller and, if a failure occurs in at least one of the steering controllers, for re-determining a target steering angle information for the vehicle wheel connected to the normal steering controller based on a driving information of the vehicle, wherein the normal steering controller controlling the steering of the vehicle wheel connected to the normal steering controller based on the re-determined target steering angle information.

2. The apparatus of claim 1, wherein if the vehicle is in a manual driving mode, the controller determines the target steering angle information for each vehicle wheel by using a steering angle information of a steering wheel and a vehicle speed information of the vehicle among the driving information of the vehicle, and provides the target steering angle information determined for each vehicle wheel to each of the steering controller respectively.

3. The apparatus of claim 1, wherein if the vehicle is in a autonomous driving mode, the controller determines the target steering angle information for each vehicle wheel by using a steering angle information detected in real time and a vehicle speed information of the vehicle among the driving information of the vehicle, and provides the target steering angle information determined for each vehicle wheel to each of the steering controller respectively.

4. The apparatus of claim 1, wherein if a failure occurs in at least one of the steering controllers, the controller is configured to re-determine the target steering angle information of the vehicle wheel connected to the normal steering controller based on the driving information of the vehicle in order that a driving trajectory value of the vehicle is maintained as a substantial same value before and after the failure of at least one of the steering controllers, and is configured to provide the re-determined target steering angle information of the vehicle wheel connected to the normal steering controller to the respective normal steering controller, wherein the normal steering controller is configured to perform an angle tracking control based on the re-determined target steering angle information of the vehicle wheel so as to steer each of the vehicle wheel connected to the normal steering controller.

5. The apparatus of claim 1, wherein if a failure occurs in at least one of the steering controllers, the controller is configured to re-determine the target steering angle information of the vehicle wheel connected to the normal steering controller based on the driving information of the vehicle in order that a sum of cornering force values generated at vehicle wheels is maintained as substantially identical value before and after the failure of at least one of the steering controllers, and is configured to provide the re-determined target steering angle information of the vehicle wheel connected to the normal steering controller to the respective normal steering controller, wherein the normal steering controller is configured to perform an angle tracking control based on the re-determined target steering angle information of the vehicle wheel so as to steer each of the vehicle wheel connected to the normal steering controller.

6. The apparatus of claim 1, wherein at least one of a steering controller comprises:

a left front steering controller connected to a left front vehicle wheel;

a right front steering controller connected to a right front vehicle wheel;

a left rear steering controller connected to a left rear vehicle wheel;

a right rear steering controller connected to a right rear vehicle wheel;

wherein at least one of a steering controller is configured to mechanically separated from each other, to be connected to each other through a wire communication or a wireless communication, and to be communicated with the controller.

7. The apparatus of claim 6, wherein the controller is configured to determine the normal steering controller among at least one of a steering controller, if there are three normal steering controllers, to re-determine the target steering angle information of each vehicle wheel connected to each of the three normal steering controllers based on the driving information of the vehicle and to provide the re-determined target steering angle information to the three normal steering controllers respectively, wherein each of the three normal steering controllers is configured to control steering of the respective vehicle wheel based on the re-determined target steering angle information.

8. The apparatus of claim 6, wherein the controller is configured to determine the normal steering controller among at least one of a steering controller, if there are two normal steering controllers, to re-determine the target steering angle information of each vehicle wheel connected to each of the two normal steering controllers based on the driving information of the vehicle and to provide the re-determined target steering angle information to the two normal steering controllers respectively, wherein each of the two normal steering controllers is configured to control steering of the respective vehicle wheel based on the re-determined target steering angle information, wherein the two normal steering controllers comprise one of a left front steering controller and a right front steering controller, and one of a left rear steering controller and a right rear steering controller.

9. An apparatus for controlling steering of a vehicle, the apparatus comprising:

at least one of a steering controller, each of which being connected to each vehicle wheel of the vehicle and to independently control a steering of each vehicle wheel based on a target steering angle information of each vehicle wheel; and, a controller for determining a target steering angle information for each vehicle wheel based on a driving information of the vehicle and providing the target steering angle information to the corresponding steering controller;

wherein at least one of the steering controller is configured to determine a normal steering controller among at least one of the steering controller each other, wherein if a failure occurs in at least one of the steering controllers, the normal steering controller is configured to re-determine a target steering angle information for the vehicle wheel connected to the normal steering controller based on a driving information of the vehicle and to control the steering of the vehicle wheel connected to the normal steering controller based on the re-determined target steering angle information.

10. The apparatus of claim 9, wherein if the vehicle is in a manual driving mode, the controller determines the target steering angle information for each vehicle wheel by using a steering angle information of a steering wheel and a vehicle speed information of the vehicle among the driving information of the vehicle, and provides the target steering angle information determined for each vehicle wheel to each of the steering controller respectively.

11. The apparatus of claim 9, wherein if the vehicle is in a autonomous driving mode, the controller determines the target steering angle information for each vehicle wheel by using a steering angle information detected in real time and a vehicle speed information of the vehicle among the driving information of the vehicle, and provides the target steering angle information determined for each vehicle wheel to each of the steering controller respectively.

12. The apparatus of claim 9, wherein if a failure occurs in at least one of the steering controllers, the normal steering controller is configured to re-determine the target steering angle information of the vehicle wheel connected to the normal steering controller based on the driving information of the vehicle in order that a driving trajectory value of the vehicle is maintained as a substantial same value before and after the failure of at least one of the steering controllers, and configured to perform an angle tracking control based on the re-determined target steering angle information of the vehicle wheel so as to steer each of the vehicle wheel connected to the normal steering controller.

13. The apparatus of claim 9, wherein if a failure occurs in at least one of the steering controllers, the normal steering controller is configured to re-determine the target steering angle information of the vehicle wheel connected to the normal steering controller based on the driving information of the vehicle in order that a sum of cornering force values generated at vehicle wheels is maintained as substantially identical value before and after the failure of at least one of the steering controllers, and is configured to perform an angle tracking control based on the re-determined target steering angle information of the vehicle wheel so as to steer each of the vehicle wheel connected to the normal steering controller.

14. The apparatus of claim 9, wherein at least one of a steering controller comprises:
a left front steering controller connected to a left front vehicle wheel;
a right front steering controller connected to a right front vehicle wheel;
a left rear steering controller connected to a left rear vehicle wheel;
a right rear steering controller connected to a right rear vehicle wheel;
wherein at least one of a steering controller is configured to mechanically separated from each other, to be connected to each other through a wire communication or a wireless communication, and to be communicated with the controller.

15. The apparatus of claim 14, wherein at least one of a steering controller is configured to determine the normal steering controller among at least one of a steering controller each other, if there are three normal steering controllers, each of the three normal steering controllers is configured to re-determine the target steering angle information of each vehicle wheel connected to each of the three normal steering controllers based on the driving information of the vehicle,
wherein each of the three normal steering controllers is configured to control steering of the respective vehicle wheel based on the re-determined target steering angle information.

16. The apparatus of claim 14, wherein at least one of a steering controller is configured to determine the normal steering controller among at least one of a steering controller each other, if there are two normal steering controllers, each of the two normal steering controllers is configured to re-determine the target steering angle information of each vehicle wheel connected to each of the two normal steering controllers based on the driving information of the vehicle, and to control steering of the respective vehicle wheel based on the re-determined target steering angle information,
wherein the two normal steering controllers comprise one of a left front steering controller and a right front steering controller, and one of a left rear steering controller and a right rear steering controller.

17. A method for controlling steering of a vehicle, the method comprising:
determining a target steering angle information of each vehicle wheel of the vehicle by using a driving information of the vehicle;
steering independently each vehicle wheel based on the target steering angle information determined for each vehicle wheel;
determining a normal steering controller among the plurality of steering controllers, each of which independently controlling a steering of each vehicle wheel;
re-determining the target steering angle information of the vehicle wheel connected to the normal steering controller if a failure occurs in at least one of the plurality of steering controllers; and,
steering the vehicle wheel connected to the normal steering controller based on the re-determined target steering angle information.

18. The method of claim 17, wherein in determining the normal steering controller among the plurality of steering controllers, monitoring whether each of the plurality of steering controllers has a failure and determining the normal steering controller among the plurality of steering controllers,
wherein in re-determining the target steering angle information of the vehicle wheel connected to the normal steering controller, re-determining the target steering angle information of the vehicle wheel connected to the normal steering controller based on the driving information of the vehicle in order that a driving trajectory value of the vehicle is maintained as a substantial same value before and after the failure of at least one of the steering controllers, and,
wherein in steering the vehicle wheel connected to the normal steering controller, performing an angle tracking control based on the re-determined target steering angle information of the vehicle wheel so as to steer each of the vehicle wheel connected to the normal steering controller.

19. The method of claim 17, wherein in determining the normal steering controller among the plurality of steering controllers, monitoring whether each of the plurality of steering controllers has a failure and determining the normal steering controller among the plurality of steering controllers,
wherein in re-determining the target steering angle information of the vehicle wheel connected to the normal steering controller, re-determining the target steering angle information of the vehicle wheel connected to the normal steering controller based on the driving information of the vehicle in order that a sum of cornering force values generated at vehicle wheels is maintained as substantially identical value before and after the failure of at least one of the steering controllers, and,
wherein in steering the vehicle wheel connected to the normal steering controller, performing an angle tracking control based on the re-determined target steering angle information of the vehicle wheel so as to steer each of the vehicle wheel connected to the normal steering controller.

20. The method of claim 17, wherein in determining the normal steering controller among the plurality of steering controllers, monitoring whether each of the plurality of steering controllers has a failure and determining the normal steering controller among the plurality of steering controllers, wherein in re-determining the target steering angle information of the vehicle wheel connected to the normal steering controller, re-determining the target steering angle information of the vehicle wheel connected to two normal steering controllers based on the driving information of the vehicle if there are two normal steering controllers, wherein in steering the vehicle wheel connected to the normal steering controller, steering each of the vehicle wheel connected to the two normal steering controller, and, wherein the two normal steering controllers comprise one of a left front steering controller and a right front steering controller, and one of a left rear steering controller and a right rear steering controller.

\* \* \* \* \*